United States Patent Office 2,828,279
Patented Mar. 25, 1958

2,828,279

ORGANOSILICON MONOMERS AND THERMOSET RESINS PREPARED THEREFROM

Daniel W. Lewis, Pittsburgh, Pa., assignor to Westinghouse Electric Corporation, East Pittsburgh, Pa., a corporation of Pennsylvania No Drawing. Application June 21, 1954
Serial No. 438,309

12 Claims. (Cl. 260—46.5)

The present invention relates to novel organosilicon monomers and their preparation, and further to the conversion of such monomers to organopolysiloxane fluids and thermoset resinous compositions.

Organosilicon compositions are used quite extensively in the electrical industry, particularly as insulating materials for various types of electrical apparatus and equipment. The use of such compositions as insulating materials is desirable due to their extremely high thermal stability characteristics.

The object of the present invention is to provide olefin-substituted organosilicon monomers, wherein the remaining valences of silicon are satisfied by monovalent saturated hydrocarbon groups, which monomers are convertible to cured thermoset resins.

Another object of the present invention is to provide organosilicon monomers having the structural unit

wherein one silicon atom has a monovalent olefinically unsaturated hydrocarbon radical attached directly to one silicon atom and two monovalent hydrolyzable groups attached directly to the other silicon atom.

A further object of the invention is to provide resinous compositions containing disilylphenylene groups which, when applied to electrical apparatus, provide insulation therefore having outstanding physical and chemical properties.

Other and further objects of the invention will, in part, be obvious and will, in part, appear hereinafter.

To indicate more fully the advantages and capabilities of the present invention, together with other and further objects thereof, reference is made to the following detailed description.

In accordance with the present invention and in the attainment of the foregoing objects, there are provided polymerizable resinous compositions embodying the group

having a monovalent olefinically unsaturated hydrocarbon radical attached directly to the other silicon atom.

More specifically, there are provided polymerizable organosilicon monomers having the formula

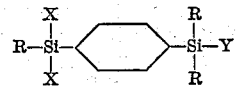

wherein R represents a monovalent hydrocarbon radical free from aliphatic unsaturation, X represents a monovalent hydrolyzable group, and Y represents a monovalent olefinically unsaturated hydrocarbon radical.

The hydrocarbon radicals, represented by R, may be either aliphatic, including methyl, ethyl, propyl, isopropyl, and the like, or aromatic, including benzyl, phenyl, and the like.

The olefinically unsaturated hydrocarbon radical, represented by Y, may be a vinyl, allyl, vinyl phenyl, or like radical.

The hydrolyzable groups, represented by X, may be either alkoxy, aryloxy, halogeno or amino. When the hydrolyzable group is an alkoxy material, the alkyl radical may be either primary, secondary or tertiary, for example, methyl, ethyl, propyl, butyl, isopropyl, isobutyl, secondary butyl, tertiary butyl, hexyl, and the like. When the hydrolyzable group is an aryloxy group, the aryl radical may be a phenyl radical or a substituted phenyl radical. In place of the alkoxy and aryloxy groups just described, any of the halogens or an amino radical may be used as the hydrolyzable group in accordance with this invention. It is preferred to use those materials in which the hydrolyzable groups comprise alkoxy groups in which the alkyl radical is primary and contains from 1 to 8 carbon atoms per molecule.

An organosilicon monomer which has been found to be particularly suitable for use in accordance with this invention is p-(dimethylvinylsilyl)phenyldiethoxymethylsilane. This monomer, which has the formula

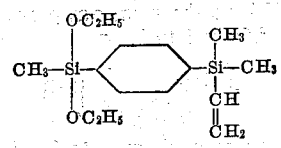

may be prepared conveniently in two steps; the first step comprising preparing p-bromophenyldimethylvinylsilane and the second step comprising reacting the p-bromophenyldimethylvinylsilane with magnesium and triethoxymethylsilane. As an example of one method for the preparation of this monomer, the following is given.

STEP I

*Preparation of p-bromophenyldimethylvinylsilane*

Four mols of a Grignard reagent prepared from 125 grams of magnesium, 944 grams (4 mols) of p-dibromobenzene, and 2 liters of dry ether, are added with stirring to 807.5 grams (5 mols) of trichlorovinylsilane. Salts which precipitate during the reaction are removed by filtration, decantation, or the like. Ether and unreacted trichlorovinylsilane then are distilled from the filtrate, leaving 580 grams of a liquid distilling between about 80° and 120° C. at a pressure of 1 mm. of mercury. This liquid is dissolved in an equal volume of ether and added, with stirring, to 4 mols of methyl magnesium bromide. The mixture is refluxed gently for about 12 to 18 hours and then poured onto crushed ice. Sufficient dilute hydrochloric acid is added to cause the mixture to separate into two clear liquid layers. The lower organic layer is washed successively with water, dilute sodium hydroxide, and again with water. Upon distillation there is obtained a yield of about 385 grams of p-bromophenyldimethylvinylsilane.

STEP II

*Reaction of p-bromophenyldimethylvinylsilane with magnesium and triethoxymethylsilane*

A Grignard reagent, prepared from about 290 grams (1.2 mols) of the p-bromophenyldimethylvinylsilane prepared as described in Step I above and 30 grams of magnesium dissolved in 1.2 liters of dry ether is added, with stirring, to 356 grams (2 mols) of triethoxymethylsilane dissolved in an equal volume of ether. The mixture is stirred and gently heated for about 14 to 18 hours, after which ether is distilled therefrom. Precipitated salts are removed and unreacted triethoxymethylsilane is distilled from the filtrate, leaving about 255 grams of p-(dimethylvinylsilyl)phenyldiethoxymethylsilane.

The organosilicon monomers of this invention may be converted to solid thermoset resins by hydrolyzing and condensing the monomers through the hydrolyzable groups thereon, and then further polymerizing or cross-linking the resultant fluid organopolysiloxanes through the olefinically unsaturated hydrocarbon radicals thereon by heating the organopolysiloxanes in the presence of one or more vinyl addition type polymerization catalysts. The monomers may be hydrolyzed in any convenient manner as, for example, by dissolving the same in a volatile organic solvent and then agitating the resultant solution in the presence of a hydrolytic agent. Examples of suitable hydrolytic agents include water, inorganic acids such as dilute sulphuric acid and dilute hydrochloric acid, as well as organic acids such as picric acid.

The olefinically unsaturated disilylphenylene organosilicon monomers of this invention may be admixed with one or more other hydrolyzable organosilicon monomers and the mixture hydrolyzed and co-condensed to produce oily, fluid siloxane copolymers which will polymerize to thermoset resins on heating in the presence of a catalyst. Such other hydrolyzable organosilicon monomers may have the general formula (a) 

where R and X have the meanings previously given and $n$ has a value of from 1 to 3, or (b) 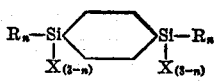

where $n$ has a value of from 1 to 2. In preparing copolymers as indicated above about 0.05 to 2 mols of hydrolyzable organosilicon monomers may be used per mol of the olefinically unsaturated disilylphenylene organosilicon monomers.

The hydrolysis reaction preferably is carried out in the presence of a liquid organic material in which the monomers and hydrolytic products are soluble. Examples of suitable organic materials include benzene, toluene, xylene, diethyl ether, methanol, ethanol and propanol. The amount of solvent employed is not critical, however, the more dilute the solution the less viscous will be the resulting hydrolysis product comprising the organopolysiloxanes.

The organopolysiloxanes are oily fluids and may be polymerized or cross-linked to solid thermoset resins by heating the same to about 100° to 180° C. for about one to four hours or more in the presence of at least one vinyl addition type polymerization catalyst.

Suitable examples of such catalysts include benzoyl peroxide, lauroyl peroxide, methyl ethyl ketone peroxide, t-butyl hydroperoxide, di-t-butyl peroxide, ascaridole, tert-butyl perbenzoate, di-t-butyl diperphthalate, 2,2-di-t-butylperoxy butane, and oxonides. In general, such catalysts are employed in an amount of from 0.1% to 2% by weight, although somewhat larger or smaller amounts may be employed if desired. Polymerization accelerators such as cobalt naphthenate and azomethines also may be employed. Polymerization also may be effected through the utilization of actinic light.

The following examples illustrate the preparation of solid resinous compositions in accordance with this invention.

EXAMPLE I

A portion of the monomer p-(dimethylvinylsilyl)-phenyldiethoxymethylsilane, to which had been added about 4% by weight tertiary butyl perbenzoate, was poured into an aluminum dish having a diameter of about 60 mm. The dish then was placed in an oven open to the atmosphere and heated at a temperature of 135° C. for about 15 hours. At the end of this time the monomers had polymerized to a tough resin.

EXAMPLE II

About 60 grams (0.2 mol) of p-(dimethylvinylsilyl)-phenyldiethoxymethylsilane and 42 grams (0.2 mol) of diethoxymethylphenylsilane were dissolved in about 100 cc. of benzene. About 100 cc. of 5% sulfuric acid then were added. After stirring for two hours the resultant benzene solution was separated and treated in like manner with 100 cc. of 75% sulfuric acid. Stirring was continued for another two hours after which about one liter of crushed ice and water were added to the solution. The benzene solution was separated, washed with dilute sodium hydroxide to remove free acid, and dried over potassium carbonate. Upon evaporation of benzene, 65 grams of a colorless slightly cloudy oil were obtained. A sample of the oil to which had been added about 3% by weight tertiary butyl perbenzoate, gelled in about 2 hours at 100° C.

EXAMPLE III

One-tenth of a mol each of p-(dimethylvinylsilyl)-phenyldiethoxymethylsilane and 1,4-bis-(ethoxydimethylsilyl)benzene were dissolved in 75 cc. of benzene. To this was added with stirring 100 cc. of 5% $H_2SO_4$. The resultant solution was stirred for 1 hour, after which 500 cc. of ice was added. The benzene layer was separated and treated in a like manner with 100 cc. of 75% $H_2SO_4$. The benzene solution was separated again, washed free of acid, and dried over anhydrous $K_2CO_3$. Benzene was evaporated from the filtered solution giving a very viscous oil. A sample of the oil containing 4.7% tertiary butylperbenzoate gelled in two hours at 100° C.

EXAMPLE IV

A solution comprising 0.05 mol each of p-(dimethylvinylsilyl)phenyldiethoxymethylsilane, diethoxydimethylsilane, diethoxymethylvinylsilane, and 1,4-bis-(diethoxymethylsilyl)benzene dissolved in 100 cc. benzene and cooled to 0° C., was treated with 100 cc. of 80% $H_2SO_4$. After stirring for one and one-half hours crushed ice was added. The benzene layer was separated, washed free of acid with $NaHCO_3$, and dried over $K_2CO_3$. Benzene was evaporated from the filtered solution giving 25.5 gms. of a viscous oil. A sample of the oil containing 3.3% tertiary butylperbenzoate set up at 100° C. in two hours.

The olefinically unsaturated organopolysiloxanes prepared as described above and illustrated in the examples have a long storage or shelf-life and, in general, will not gel or set up in the form of thermoset resins until they are heated in the presence of a catalyst, as described. If desired, however, a relatively small proportion of one or more polymerization inhibitors may be incorporated in the organopolysiloxanes to aid in preventing premature polymerization and to extend the shelf-life of the product. Inhibitors which are suitable for this purpose include substituted phenols and aromatic amines. More specific examples of suitable polymerization inhibitors are hydroquinone, resorcinol, tannin, sym. alpha, beta naphthyl p-phenylene diamine, and the like. The inhibitor, if employed, should be present in only relatively small proportions. Thus, amounts less than about 1.0% should be used, with amounts as small as about 0.01% to about 0.1% generally being sufficient.

It is a further important feature of this invention that from 5 to 95% by weight of the novel olefinically unsaturated organopolysiloxanes here described can be dissolved in liquid reactive unsaturated monomers having the group $>C=C<$ and subsequently copolymerized by cross-linking between the unsaturated groups. Such a solution will polymerize completely upon heating in the presence of one or more of the vinyl addition type polymerization catalysts set forth hereinabove to yield a thermoset resin.

Examples of liquid reactive unsaturated monomers having the group $>C=C<$ which are suitable for use in accordance with this invention, include monostyrene, vinyl toluene, alphamethylstyrene, 2,4-dichlorostyrene, paramethylstyrene, vinyl acetate, methyl methacrylate, ethyl acrylate, diallyl phthalate, diallyl succinate, diallyl maleate, methallyl alcohol, acrylonitrile, methyl vinyl ketone, diallyl ether, butyl methacrylate, allyl acrylate, allyl crotonate, 1,3-chloroprene, triallylcyanurate, and divinyl benzene, as well as mixtures of any two or more of these monomers.

The resinous compositions of this invention are suitable for making synthetic compositions of many kinds. Thus, they may be used in the preparation of laminates, moldings, and the like which may be produced by applying coatings of the fluid compositions to sheets of asbestos cloth, glass cloth or the like and then molding under heat and pressure. Furthermore, they may be used in preparing cast members by pouring the resinous compositions into a mold and then curing to shape to form knife handles, and other utensils, boats, household articles and appliances, and the like. The compositions also have utility as potting resins for use in preparing transformers and electronic equipment of many kinds.

The compositions of this invention are particularly suitable for use as resinous materials for encapsulating various kinds of electrical equipment. Finely divided inorganic flake-like materials such as mica flakes, when introduced in amounts within the range of about 25 to 50% by weight of the composition, impart improved thixotropic properties to the compositions of this invention. Other finely divided inorganic materials such as silica, asbestos, glass or the like may be used to impart thixotropic properties to the compositions, although such materials are not as satisfactory for this purpose as are mica flakes.

Electrical apparatus may be encapsulated, using the compositions of this invention, in accordance with any of the encapsulating procedures in commercial practice. Thus, the compositions may be employed in the process disclosed in U. S. application, Serial No. 225,808, now Patent No. 2,795,009, issued May 11, 1957. In addition to the foregoing, the compositions of this invention may be applied as coatings and impregnants to coils and the like by conventional dipping and surface coating procedures.

While the present invention has been described with reference to particular embodiments and examples, it will be understood, of course, that modifications, substitutions and the like may be made therein without departing from the true scope of the invention.

I claim as my invention:

1. A polymerizable composition comprising an organosilicon monomer having the structural unit

having a monovalent olefinically unsaturated hydrocarbon radical having terminal vinyl groups attached directly to one silicon atom and two monovalent hydrolyzable groups attached directly to the other silicon atom, the remaining valences of the silicon atoms being satisfied by monovalent saturated hydrocarbon radicals.

2. A polymerizable composition as set forth in claim 1 which contains at least one polymerization inhibitor.

3. A polymerizable composition as set forth in claim 1 which contains at least one vinyl addition type polymerization catalyst.

4. A polymerizable organosilicon monomer having the formula

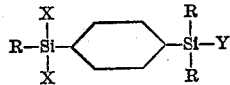

wherein R represents a monovalent hydrocarbon radical free from aliphatic unsaturation, X represents a monovalent hydrolyzable group, and Y represents a monovalent olefinically unsaturated hydrocarbon radical having terminal vinyl groups.

5. A solid thermoset resinous product of the hydrolysis and polymerization of a composition comprising an organosilicon monomer set forth in claim 4.

6. An insulated electrical member comprising an electrical conductor, solid insulation disposed upon the electrical conductor, the solid insulation having interstices therein, and a solid thermoset resinous material disposed within the interstices of the solid insulation and completely filling the same, the solid thermoset resinous material being the product of the hydrolysis and polymerization of a composition comprising an organosilicon monomer having the formula

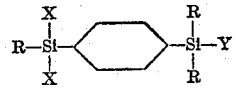

wherein R represents a monovalent hydrocarbon radical free from aliphatic unsaturation, X represents a monovalent hydrolyzable group, and Y represents a monovalent olefinically unsaturated hydrocarbon radical having terminal vinyl groups.

7. An insulated electrical member comprising an electrical conductor and a layer of a solid thermoset resinous material applied to the exterior surface thereof, said solid thermoset resinous material being the product of the hydrolysis and polymerization of a composition comprising an organosilicon monomer having the formula

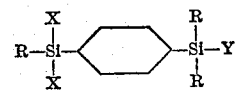

wherein R represents a monovalent hydrocarbon radical free from aliphatic unsaturation, X represents a monovalent hydrolyzable group, and Y represents a monovalent olefinically unsaturated hydrocarbon radical having terminal vinyl groups, said resinous material having incorporated therein finely divided inorganic flake-like material in an amount sufficient to impart thixotropic properties to the resinous material.

8. A cured thermoset resinous composition comprising a quantity of organosilicon monomers having the structural unit

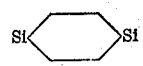

wherein one of the silicon atoms has olefinically unsaturated hydrocarbon radical having terminal vinyl groups attached directly thereto and the other silicon atom has at least one monovalent hydrolyzable group attached directly thereto, the remaining valences of silicon in the composition being satisfied by monovalent saturated hydrocarbon radicals, the resinous composition being characterized by both cross-linkages through reaction between the olefinically unsaturated hydrocarbon radicals having terminal vinyl groups on one silicon atom and by siloxane linkages through the hydrolyzable groups on the other silicon atom.

9. A process for the preparation of a cured resinous composition which comprises hydrolyzing a quantity of organosilicon monomers having the structural unit

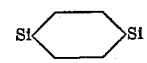

wherein one silicon atom has a monovalent olefinically unsaturated hydrocarbon radical having terminal vinyl groups attached directly thereto and two monovalent hydrolyzable groups attached directly to the other silicon atom, the remaining valences of the silicon atoms being satisfied by monovalent saturated hydrocarbon radicals, and heating the hydrolyzed monomers to convert the same to a thermoset resin.

10. A process as set forth in claim 9 wherein the hydrolyzed monomers are heated in the presence of catalytic amounts of at least one vinyl addition type polymerization catalyst.

11. A process for the preparation of a cured resinous composition which comprises hydrolyzing a quantity of organosilicon monomers having the structural unit

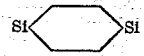

wherein the silicon atom has a monovalent olefinically unsaturated hydrocarbon radical having terminal vinyl groups attached directly thereto and two monovalent hydrolyzable groups attached directly to the other silicon atom, the remaining valences of the silicon atoms being satisfied by monovalent saturated hydrocarbon radicals, dissolving the hydrolyzed mixture in a liquid reactive monomer having a terminally unsaturated olefinic group $>C=C<$, and heating the resulting solution to convert the same to a thermoset resin.

12. A process as set forth in claim 11 wherein the heating is carried out in the presence of catalytic amounts of at least one vinyl addition type polymerization catalyst.

No references cited.